United States Patent [19]

Ridenour

[11] 4,281,862

[45] Aug. 4, 1981

[54] TUBING JOINT ASSEMBLY

[76] Inventor: Ralph G. Ridenour, 626 Lexington-Ontario Rd., Mansfield, Ohio 44903

[21] Appl. No.: 948,905

[22] Filed: Oct. 5, 1978

Related U.S. Application Data

[63] Continuation-in-part of Ser. No. 887,491, Mar. 17, 1978, abandoned.

[51] Int. Cl.³ .............................................. F16L 13/14
[52] U.S. Cl. ................................ 285/382.2; 29/516; 285/397; 285/398
[58] Field of Search .................. 285/382, 382.2, 382.1, 285/398, 397, 417, 256; 29/516

[56] References Cited

U.S. PATENT DOCUMENTS

| | | | |
|---|---|---|---|
| 1,954,989 | 4/1934 | Eastman | 285/256 |
| 2,479,499 | 8/1949 | Le Clair | 285/256 |
| 3,017,203 | 1/1962 | Macleod | 285/256 |
| 3,188,117 | 6/1965 | Press et al. | 285/256 X |
| 3,477,750 | 11/1969 | Powell | 285/382 X |
| 3,689,111 | 9/1972 | Osmun et al. | 285/382 X |
| 3,744,122 | 7/1973 | Ridenour et al. | 285/382.2 X |
| 3,777,354 | 12/1973 | Masters | 285/398 X |
| 4,114,930 | 9/1978 | Perkins et al. | 285/382 X |

FOREIGN PATENT DOCUMENTS

| | | | |
|---|---|---|---|
| 285399 | 7/1965 | Australia | 285/382 |
| 511483 | 6/1952 | Belgium | 285/382 |

*Primary Examiner*—Thomas F. Callaghan
*Attorney, Agent, or Firm*—Pearne, Gordon, Sessions, McCoy & Granger

[57] ABSTRACT

A sleeve is used in a tubing joint assembly, usually an inner sleeve, with a tube telescoped over this inner sleeve. An outer sleeve may optionally be telescoped over the tube and the entire assembly. One of the sleeves has a lateral shoulder transverse to the axis of the sleeve and with this shoulder terminating in a sharp angled peripheral rib. The outer sleeve is inwardly compressed by two dies which have interdigitated teeth. This compresses the outer sleeve, where used, and compresses the tube at the peripheral ribs of the sleeve. The interdigitated teeth on the dies assure complete compression all the way around the periphery, between the tube and the sleeve with a lateral shoulder being formed on the tube to act against the lateral shoulder on the sleeve and thus longitudinally retain together these parts. Also a fluid pressure tight seal is established primarily at the sharp angled peripheral rib and its junction with the facing wall of the tube.

5 Claims, 12 Drawing Figures

TUBING JOINT ASSEMBLY

This application is a continuation-in-part of my application Ser. No. 887,491, filed Mar. 17, 1978 abandoned.

BACKGROUND OF THE INVENTION

A tube fitting assembly has been disclosed in U.S. Pat. No. 3,744,122 wherein a pair of dies inwardly compress a tube onto a tubular part of a fitting. The dies had long and short fingers to alternately overlap to create shear walls and merging walls to promote a good compression inwardly of the tube onto the tubular extension of the fitting. Such tube fitting was contemplated as having both a tube and the tubular extension of the fitting of the same type of metal, for example, aluminum, which could be readily deformed. Such tube fitting did not disclose the use of preformed sharp angled shoulders or biting surfaces on the inner tubular part, and hence was limited in the amount of fluid pressure that it could withstand and the amount of rapid temperature change that it could withstand without leaking.

Another prior art tube fitting was one which used a soft metal sleeve on the outside of a plastic body and the soft metal sleeve was compressed inwardly by a compound movement of three dies so that the plastic body was compressed onto an inner tube. The difficulty with such construction was attempting to insure the uniform compression in all radial directions so that no leakage would occur in the tube fitting. During the compression first the outer sleeve was made oval in shape and then attempted to be changed to a round cross-section. A major difficulty with this construction was the fact that different tubes have a manufacturing tolerance in dimensions, and if the tube was slightly under size then the dies had difficulty to compress the sleeves sufficiently for a fluid tight seal.

Another prior art construction was used for sealing a tubular tank onto a nosecone of a rocket. The nosecone had annular ribs to which the tubular tank wall was secured by an inward force which was substantially radially inward in all positions around the periphery. In order to obtain this radially inward force, an explosive impulse was required or a high energy rate magnetic impulse was required. Another alternative was welding. All three such methods could be quite satisfactory for military applications, but for tube fittings manufactured by the millions, the extremely high cost of such seal forming methods made them out of the question from a commercial standpoint.

SUMMARY OF THE INVENTION

The problem to be solved is how to achieve a fluid pressure tight seal in a very economical manner in a tube fitting assembly which is subject to fluid shocks, rapid temperature changes and high fluid pressure. This problem is solved by a tubing joint, comprising, in combination, an inner tubular part having an outer wall, an outer tubular part surrounding and extending over said inner tubular part, retention means longitudinally retaining together said tubular parts and including a lateral shoulder on said inner tubular part larger in cross-sectional area than and acting against a lateral abutment on said outer tubular part, seal means establishing a fluid tight seal between said tubular parts and including a laterally directed sharp-angled peripheral rib on one of said tubular parts engaging an annular area on the other of said tubular parts, and said retention means including an inwardly compressed portion of said outer tubular part with a longitudinal row of a plurality of oppositely directed circumferentially extending teeth on the exterior surface of said outer tubular part.

An object of the invention is to provide a tubing joint assembly wherein a V-shape annular rib is formed on an inner or outer tubular part to bite into the surface of a telescoped tubular part compressed therewith.

Another object of the invention is to provide a tubing joint assembly wherein a plurality of anti-rotation ridges are formed in one of a pair of telescoped parts and are compressed into the other part.

Another object of the invention is to provide a tubing joint assembly with a pre-assembled inner and outer sleeve into which the tube ends may be inserted and then the assembly compressed.

The problem may also be solved by utilizing the method of making a tube joint assembly by the use of two dies acting on inner and outer telescoped tubular parts having facing walls comprising, the steps of, forming a plurality of peripheral ribs on the facing wall of one of the tubular parts with each rib having a laterally extending shoulder and a biting surface, telescoping the outer tubular part over the inner tubular part, and laterally compressing the outer part inwardly by two dies having interdigitated teeth to form on the exterior surface of the joint assembly a toothed area of a plurality of circumferentially extending teeth, said lateral compression causing said biting surfaces to indent the facing wall of the other part and form a shoulder thereon acting longitudinally against said laterally extending shoulder to longitudinally retain together the tubular parts, and said lateral compression establishing a fluid pressure tight seal which includes an annular area at the junction of the parts generally at said biting surfaces.

Another object of the invention is to provide a method of fabricating a tube joint assembly which includes forming a plurality of sharp V-shape ribs on a sleeve which bite into a tubular part upon compression of the assembly for both longitudinal retention and a seal.

Other objects and a fuller understanding of the invention may be had by referring to the following description and claims, taken in conjunction with the accompanying drawing.

DESCRIPTION OF THE PREFERRED EMBODIMENTS

The invention is illustrated in the accompanying drawing as being an improved tubing joint assembly and the method for making this tubing joint. An inner and an outer tubular part are joined together by an inward compression force on the outer tubular part. In addition there may be an optional outer sleeve onto which the compression force is applied and through this outer sleeve to the outer of the two tubular parts. The two tubular parts are telescoped together to establish a facing wall on each of these two parts. On one of the facing walls a lateral shoulder is established which is peripheral in direction. This lateral shoulder terminates in a peripheral biting surface which may be a sharp shoulder edge or a V-shape. When compression dies are used to compress the outer tubular part onto the inner tubular part, the biting surface bites into the surface of the other facing wall to establish a second lateral shoulder. The coaction between the lateral shoulder on one tubular part and the lateral shoulder on the other tubular part establishes a longitudinal retention means so that the two tubular parts resist being pulled apart. This enables the tubing joint to withstand high pressures.

Additionally a fluid pressure tight seal is established primarily at the sharp angled shoulder of the peripheral rib so that an annular seal is established between the two tubular parts. The use of two dies with interlocking or interdigitated teeth establishes an inward compression force in all circumferential positions around the periphery of the tubing joint and especially includes a radially inward force along lines generally perpendicular to the direction of movement of the two dies in compression upon the outer tubular part. This is extremely important in achieving a fluid pressure tight seal in a complete annular path.

Figure 1:
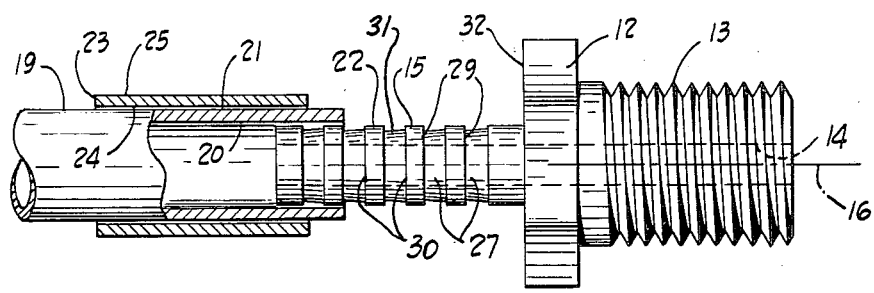
FIG. 1 is a side elevational view, partly in longitudinal section, showing a partly assembled tubing joint according to the invention.
Figure 2:
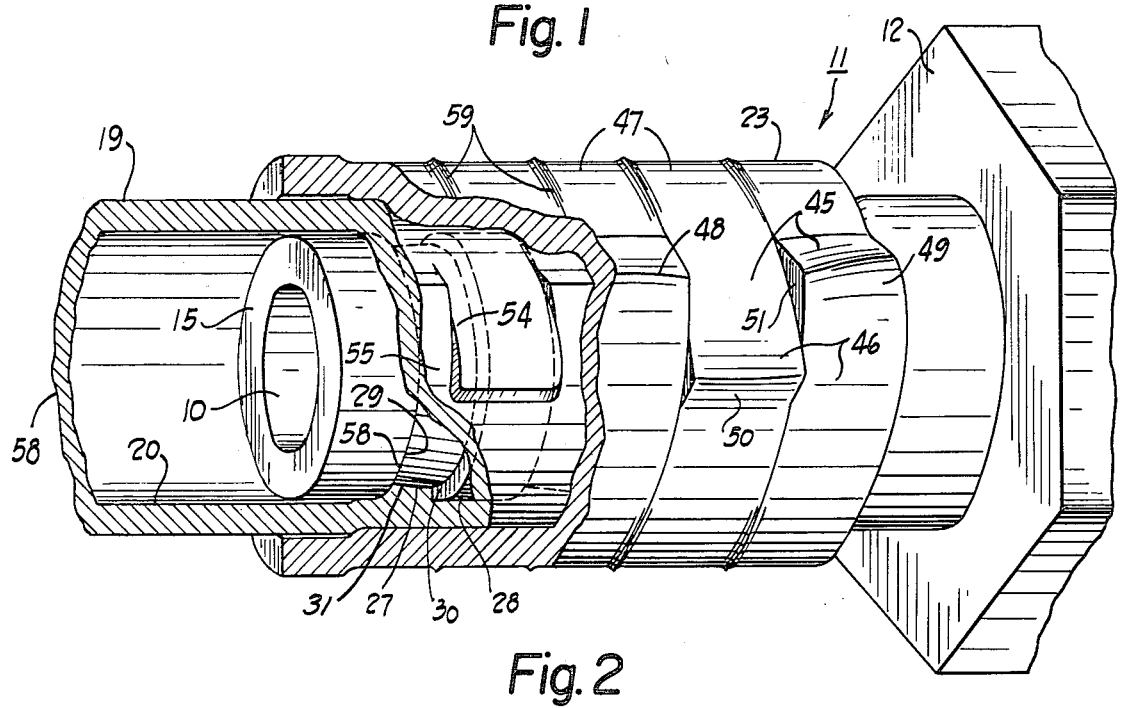
FIG. 2 is an isometric view, partly in section, of the assembled fitting of FIG. 1.

FIG. 1 illustrates a tubing joint just prior to assembly and FIG. 2 is an isometric view illustrating the same tubing joint assembly 11 as completed. FIG. 1 illustrates a tube fitting 12 having a body portion with male threads 13 for securing the fitting 12 to some utilization device, not shown. The fitting 12 has an internal bore 14 for passage of fluid. The fitting 12 has a first tubular part 15 extending along the axis 16 of the internal bore 14. This merely illustrates one form of fitting wherein the internal bore 14 communicates with the inner wall of the first tubular part 15, and this may be many types of fittings such as elbow, T or cap fittings. A tube 19 having an inner wall 20 and outer wall 21 is shown with the inner wall 20 partly telescoped over the outer wall 22 of the tubular part 15. A sleeve 23 is optional and has an inner wall 24 and outer wall 25. The sleeve 23 is shown with the inner wall 24 telescoped over the end of the tube 19.

Walls 20 and 22 face each other and walls 21 and 24 face each other. One of these facing walls has been machined or otherwise formed to establish grooves 27 and these grooves 27 are shown in wall 22 to form a plurality of peripheral ribs 28 having lateral shoulder 29 facing longitudinally rearwardly and lateral shoulders 30 facing longitudinally forwardly, relative to the outboard end of the tubular part 15. The bottom wall 31 of the grooves 27 may be parallel to the axis 16, as shown in FIG. 1, or may be slightly inclined to this axis, as shown in FIG. 2.

To complete the tubing joint assembly 11 as shown in FIG. 2, the parts shown in FIG. 1 are telescoped so that the tube 19 preferably completely covers the tubular part 15 and the sleeve 23 covers all or most of the end of the tube 19. In FIG. 2, the sleeve 23 is spaced from the face 32 of the fitting 12. Generally, both the sleeve 23 and tube 19 will have the ends thereof abutting the face 32 of the fitting 12, as a stop. Initially all of the parts will generally have a slip fit with a few thousandths of an inch clearance, although an interference fit is possible to be used. The normal manufacturing tolerance on metal tubes may be 0.003 to 0.005 inches in internal diameter, so the usual clearance between the parts is slightly more than this, in the range of one-eighth to one-half inch inside diameter of the tube 19 and sleeve 23. In the preferred embodiment, all of the parts are of metal, for example, they may include an aluminum fitting 12 and aluminum tube 19 with the sleeve 23 of aluminum or stainless steel, or perhaps plated ordinary steel.

Figure 6:
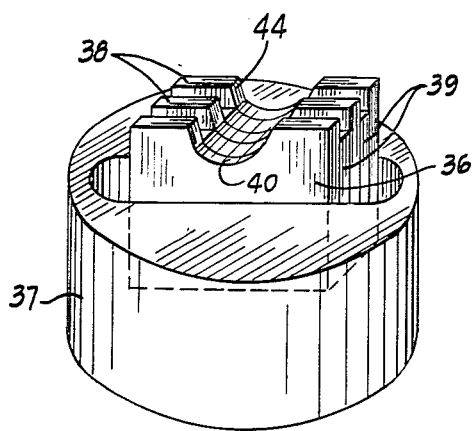
FIG. 6 is an isometric view of a die which may be used to compress the tubing joint.
Figure 7:
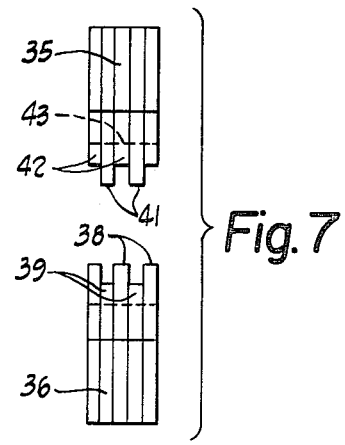
FIG. 7 is a side elevational view of two dies which may co-act to form the tubing joint.

After the sleeve 23 and tube 19 have been pushed up against the stop face 32, then a pair of dies 35 and 36 as shown in FIG. 7 are used to compress the assembled parts. The die 36 is shown in perspective view in FIG. 6 and includes a die holder 37 in which are mounted a plurality of long fingered plates 38 alternating with a plurality of short fingered plates 39. A partially cylindrical aperture 40 is formed in all of plates 38 and 39 of a dimension to compress the sleeve 23. As shown in FIG. 7 the other die 35 is quite similar to the die 36 but with complementary long and short fingered plates 41 and 42, respectively. As best seen in FIG. 7 the long fingers 41 will interlock with or interdigitate with the long fingers 38 of the die 36 when the two dies 35 and 36 are moved together. There is a partially cylindrical aperture 43 in the die 35 which is complementary to the partially cylindrical aperture 40 in die 36. Together these form a generally cylindrical aperture to receive the sleeve 23 and compress this sleeve so that when the dies 35 and 36 are compressed on the assembled parts, a compression staked surface 45 is established on the outer portion of the sleeve 23. This may be generally the same as in U.S. Pat. No. 3,744,122 issued July 10, 1973.

This compression staked surface includes a toothed area 46 and an inwardly compressed area 47. The cylindrical aperture 40, 43 formed by the closed dies 35, 36 is smaller than the initial diameter of the sleeve 23, so that the inwardly compressed area 47 is formed and the metal is worked or partially extruded to form individual teeth 48 in the toothed area 46. These individual teeth are interdigitated with the diverging walls 44 of the dies forming a merging wall 49. Junction walls 50 are formed generally at the junction of the merging wall 49 with the short fingers of the other die. Shear walls 51 are formed between the interdigitated teeth 48, because the extruded metal is partially sheared and lies generally perpendicular to the merging walls 49. The effect of these interdigitated teeth 48 is to establish a large inwardly directed force generally perpendicular to the direction of movement of the dies 35 and 36 in closing on the assembled parts. This is in contradistinction to the generally outward bulging of sleeves at the junction of prior art compression dies which do not have the interdigitated fingers on the dies.

This toothed area 46 therefore has a large component of inwardly directed compression force which is transmitted through the material of the sleeve 23 to compress it inwardly into engagement with the tube 19 and in turn to compress it inwardly to engage all of the exterior surface of the inner tubular part 15.

It is difficult to take apart one of the tube joint assemblies after it has been assembled, yet when one has been sawed apart longitudinally and disassembled, one may observe on the outer surface of the tube 19 a zig-zag seal path 54. This zig-zag seal path lies immediately beneath the toothed area, and specifically beneath each of the junction walls 50 there are slightly compressed seal areas 55 which seal areas are intermeshing or interdigitated. The zig-zag seal path 54 forms indentations in the outer surface 21 of the tube 19 so that a fluid tight seal is established between the sleeve 23 and tube 19. This fluid tight seal path is not needed in this particular embodiment using the extra sleeve 23 as a reinforcing sleeve for mechanical strength. However, this zig-zag seal path 54 does assure that the tube 19 is inwardly compressed all around the periphery thereof on to the outer surface 22 of the inner tubular part 15.

The inner tubular part 15 in this embodiment, has the grooves 27 and peripheral ribs 28 separated by the lateral shoulders 29 and 30. Due to the inward compression of the tube 19, the inner wall 20 thereof makes a fluid tight seal with the inner tubular part 15. The path of this seal is established primarily at the laterally directed sharp angled edge formed at the junction between the peripheral rib 28 and each of the shoulders 29 and 30. This is a sharp biting edge on the inner tubular part 15 which bites into the inner surface 20 of the tube 19 as it is being compressed inwardly. Thus the peripheral ribs 28 are biting surfaces to establish this good fluid tight seal.

Retention means is also provided to resist longitudinal separation of the tube 19 and inner tubular part 15. At fluid pressures up to 2,000 psi, for example, there is a large longitudinal separating force which is resisted primarily by the rearwardly facing lateral shoulders 29 engaging and acting against a compression formed lateral shoulder 58 on the tube 19. For this reason, the bottom of the groove 27 may be slightly inclined relative to the axis as shown in FIG. 2, rather than substantially parallel to the axis 16 as shown in FIG. 1. To establish a fluid tight seal and to establish the retention means, it is not imperative that the compression formed lateral shoulder 58 extend completely to the radially inward edge of the lateral shoulders 29 and 30, yet in actual practice it has been found that the dies 35 and 36 will produce such compression formed lateral shoulders so that there are no voids whatever in the space between the tube 19 and the inner tubular part 15. Small ridges 59 may be formed on the outer surface by the spaces between the plates of the dies.

Figure 3:
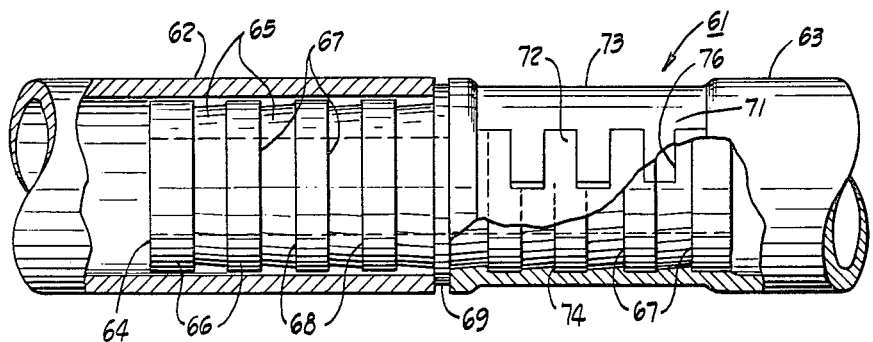
FIG. 3 is a side elevational view, partly in longitudinal section, of another embodiment of the invention.

FIG. 3 illustrates another tubing joint assembly 61 which connects one tube 62 with another tube 63 by means of an inner tubular part, in this case a sleeve 64. The left half of FIG. 3 is shown with the tube 62 telescoped over the sleeve 64, but not yet compressed, whereas the right half of FIG. 3 is shown after the tube 63 has been compressed upon the sleeve 64. It will be understood that the tube 62 is compressed upon the sleeve 64 to complete the entire tubing joint assembly 61, but the FIG. 3 is shown in this manner to show the transition between the merely telescoped condition of the tube and sleeve and the finished assembly 61.

In this assembly 61 of FIG. 3, there is no fitting involved as a large machined fitting body, merely the sleeve 64 which provides physical connection between the fluid communication between the tubes 62 and 63. The sleeve 64 is provided with grooves 65 which form the peripheral ribs or lands 66. Lateral shoulders interconnect these ribs and grooves with the lateral shoulders including rearwardly facing lateral shoulders 67 and forwardly facing lateral shoulders 68. The sleeve 64 may also have a small centering stop 69 to aid in establishing each tube 62 and 63 telescoped over substantially half of the length of the sleeve 64.

If long enough dies 35 and 36 are provided, the entire tubing joint assembly 61, embracing both of the tube ends 62 and 63, may be compressed at one time. Alternatively, if short dies are used as shown in FIGS. 6 and 7, then only one half of the joint assembly 61 may be compressed at a time, as shown at the right half of FIG. 3. The use of these dies of the type shown in FIGS. 6 and 7 will again produce the compression staked surface 71, this time directly on the outer surface of the tubes 62 and 63. The compression staked surface includes a toothed area 72 and an inwardly compressed area 73. The cylindrical aperture 40, 43 in the dies will be selected to be sufficiently smaller than the initial diameter of the tubes 62 and 63 so that upon closing of the dies on the assembled parts, the compression staked surface 71 on the exterior of the tubes will force the metal of the tubes to flow into the grooves 65. As in the embodiment of FIGS. 1 and 2, this will establish a fluid tight seal and will establish a retention means to longitudinally retain the tubes on the sleeve 64.

The seal is again established by the compression of the inner surface of the tubes around the sharp angled peripheral ribs and specifically at the sharp corner of the junction of the shoulders 67 and 68 with the peripheral ribs 66. The longitudinal retention means, which resists longitudinal separation due to fluid pressure or mechanical force, is established primarily by the rearwardly facing lateral shoulders 67 on the sleeve being engaged by compression formed lateral shoulders 74 on the tubes 63 and 62. It will be noted that these rearwardly facing lateral shoulders 67, for the tube 63, are on the opposite sides of the ribs from the rearwardly facing shoulders for the tube 62.

The toothed area 72 on the exterior of the tubes 62 and 63 again establishes a zig-zag seal path 76 generally underneath the edges of the teeth of the toothed area. The prominence of this zig-zag seal path depends upon the relative hardness of the tube 63 and sleeve 64. If the sleeve 64 is of the same material as that of the tube, then the sharp peripheral edges of the ridges 66 may become somewhat rounded by action of the compression of the tube onto these edges. In such case the zig-zag seal path 76 is fairly pronounced. If the sleeve 64 is of a metal harder than that of the tube, for example if it is of steel whereas copper or aluminum tube is used, then this zig-zag seal path 76 is hardly noticeable, after the assembly is cut apart, but the fluid pressure tight seal is still present. In this construction of FIG. 3, without an external sleeve, the seal is still established at the biting surfaces of the outer portion of the peripheral ribs 66, and primarily at the junction of the peripheral ribs with the lateral shoulders 67 and 68.

Figure 4:
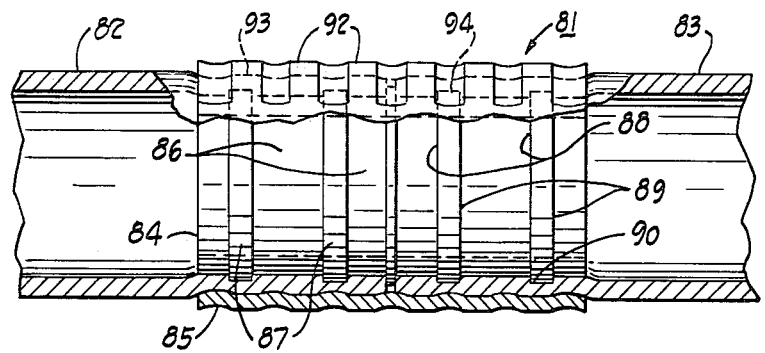
FIG. 4 is a side elevational view, partly in longitudinal section, of a further modification.

FIG. 4 illustrates another embodiment of the invention, in this case a tubing joint assembly 81 which joins a tube 82 with a tube 83 by means of an inner sleeve 84 and an outer sleeve 85. The sleeve 84 is similar to the sleeve 64 of FIG. 3 again having a plurality of grooves 86 which form peripheral ribs 87 between such grooves. The grooves are separated from the ribs by rearwardly facing lateral shoulders 88 and forwardly facing lateral shoulders 89. The outer sleeve 85 is again inwardly compressed by dies similar to dies 35 and 36 shown in FIG. 7. The diameter of the cylindrical aperture 40, 43 is made slightly smaller than the original diameter of the sleeve 85 so as to provide a desired amount of compression of the sleeve 85. In FIG. 3 the plane of movement of the dies 35 and 36 is parallel to the plane of the paper whereas the sectional view for FIG. 4 has been taken at right angles to that of the sectional view of FIG. 3 so that the plane of movement of the dies is perpendicular to the plane of the paper. This means that the interdigitated fingers on the dies 35 and 36 will provide a toothed area 92 on the periphery of the sleeve 85, as shown at the top of FIG. 4. This toothed area is similar to that on the tubing joint assembly 11 of FIG. 2 and compresses the sleeve 85 onto the tubes 82 and 83 and compresses these tubes inwardly onto the inner sleeve 84. This again establishes a zig-zag seal path 93 at the junction of the sleeve 85 and the tubes 82 and 83. This zig-zag seal path lies generally radially inwardly of the boundaries of the teeth of the toothed area 92. Also this inward compression establishes not only the zig-zag seal path 93 but another zig-zag seal path 94 between the inside of the tubes 82 and 83 and the inner sleeve 84.

Again the extent of the inward deformation of the tubes 82 and 83 and of the inner sleeve 84, depends upon the relative hardness of the sleeves 84 and 85 and tubes 82 and 83. If the inner sleeve 84 is considerably harder than the metal of the tubes 82 and 83, then there is not much deformation into the outer surface of this sleeve. The softer the metal of this inner sleeve, the more deformation takes place. Also the outer sleeve 85 may be of a relatively soft metal, as soft as that of the tubes, for example. If the tubes are of aluminum and the outer sleeve 85 is of aluminum, then there may be a considerable amount of deformation, and the toothed area 92 is quite pronounced. On the other hand, if this outer sleeve is of steel, with aluminum or copper tubing, then the toothed area is not nearly as pronounced, yet the inward compression still will take place. The advantage of the harder metal for the outer sleeve is greater mechanical strength and tends to hold the softer metal of the tube inwardly compressed despite greater fluid pressures.

The zig-zag seal path 94 establishes a seal primarily at the junction between the lateral shoulders 88 and 89 with the ribs or biting surfaces 87. The retention means is again established primarily at the longitudinally rearwardly facing lateral shoulders 88 and their engagement with compression formed lateral shoulders 90 on the tubes 82 and 83.

The zig-zag seal path 54 in the embodiment of FIGS. 1 and 2 did not achieve any fluid seal, because it was between the outer sleeve 23 and the tube 19. However, in FIG. 4 the zig-zag seal path 93 which is between the outer sleeve 85 and the tubes 82 and 83, will perform the function of a fluid pressure tight seal. This is because if for some reason the inner zig-zag seal path 94 should fail, any fluid leakage between the inner sleeve 84 and the tubes 82 and 83 would have to pass this second barrier of the zig-zag seal path 93 between the outer sleeve 85 and the tubes 82 and 83. Thus the outer sleeve 85 performs not only the function of providing greater mechanical strength but also a secondary function of providing a fluid pressure tight seal.

Figure 5:
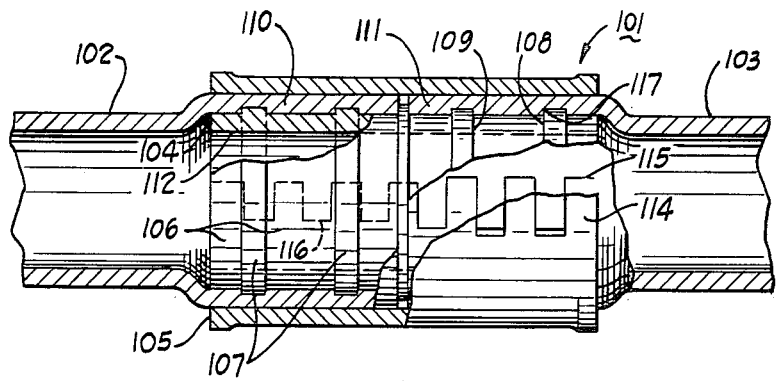
FIG. 5 is a side elevational view, partly in longitudinal section, of a still further embodiment.

FIG. 5 illustrates a still further embodiment of the invention in a tubing joint assembly 101. This assembly includes the joining of tubes 102 and 103 by means of an inner sleeve 104 and an outer sleeve 105. The inner sleeve again has on the outer surface thereof grooves 106 and ribs 107 with rearwardly facing lateral shoulders 108 and forwardly facing lateral shoulders 109. The end portions 110 and 111 of the tubes 102 and 103 have been expanded by suitable means, such as swaging, so that they will receive an enlarged inner sleeve 104, the inner diameter 112 thereof being of approximately the same diameter as the inside diameter of the tubes 102 and 103. In the assembled tubing joint assembly 101, therefore, the fluid flow will not be restricted.

The outer sleeve 105 is correspondingly slightly larger in diameter initially and is compressed by dies such as dies 35 and 36 with a suitably dimensioned cylindrical aperture 40, 43. FIG. 5 illustrates this tubing joint assembly 101 as inwardly compressed by such dies to form the toothed area 114 on the exterior surface of the outer sleeve 105. The inward compression from this toothed area 114 establishes directly beneath a zig-zag seal path 115 between the sleeve 105 and the tubes 102 and 103. Also a still further zig-zag seal path 116 is concurrently formed between the tubes 102 and 103 and the inner sleeve 104. This path 116 is shown with a broken line in FIG. 5 to distinguish it from the seal path 115. Again the extend of inward deformation at this zig-zag seal path 116 will be small or almost unnoticeable if the inner sleeve 104 is of hard material. It will be of greater extent and more noticeable, upon cutting apart of the assembly 101, if the inner sleeve 104 is of material no harder than that of the tubes 102 and 103.

The inward compression which forms the toothed area 114 establishes a compression formed lateral shoulder 117 on the tubes 102 and 103 engaging and acting against the rearwardly facing lateral shoulders 108 on the inner sleeve. This forms the retention means to withstand longitudinal pull and fluid pressure within the assembly 101.

Figure 8:
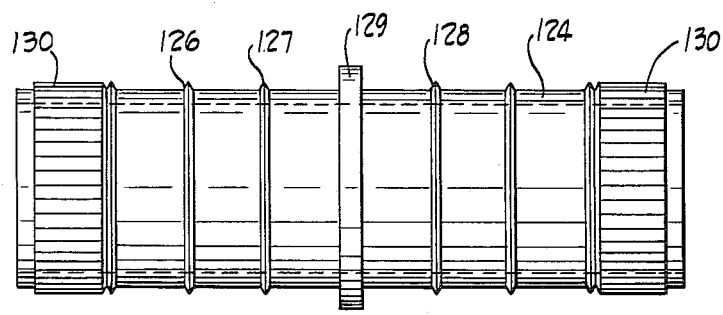
FIG. 8 is a side elevational view of a sleeve of another embodiment of the invention.
Figure 9:
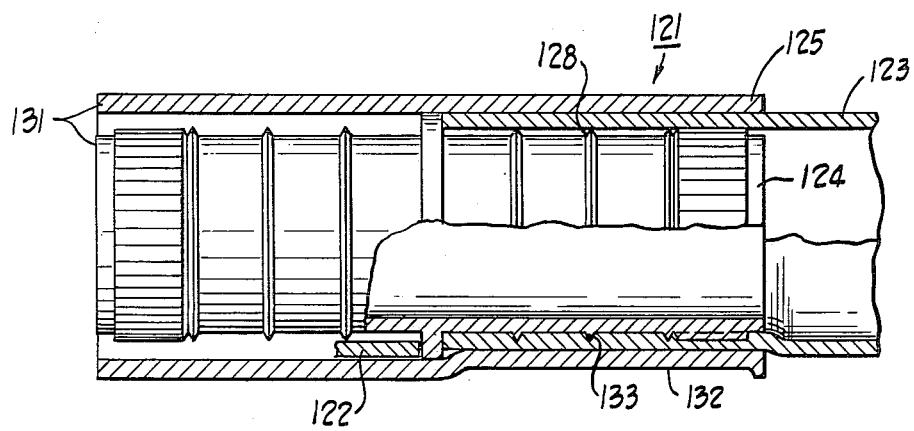
FIG. 9 is a longitudinal sectional view of the assembled fitting using the sleeve of FIG. 8.

FIGS. 8 and 9 show another embodiment of the invention with FIG. 9 showing a tubing joint assembly 121 which joins tubes 122 and 123 by means of sleeves 124 and 125. The inner sleeve 124 is shown in elevational view in FIG. 8 and this inner sleeve 124 has V-shaped peripheral ribs 125, the small ends of which form biting surfaces 127 and the sides of which form lateral shoulders 128. A central stop flange 129 is provided at the longitudinal center of the sleeve 124 and antirotation ridges 130, which are axially parallel, are provided on the two ends of this sleeve 124.

FIG. 19 shows at the left half thereof the fact that the stop flange 129 of the inner sleeve 124 has been press fitted into the outer sleeve 125. This makes a pre-assembly 131 of these two sleeves to be able to receive the ends of the two tubes 122 and 123. Part of the end of the tube 122 is shown inserted into the pre-assembly 131 at the left half of FIG. 9 and at the upper right half of FIG. 9 tube 123 is shown as inserted. At the lower right half of FIG. 9 the assembly has been compressed by means of compression dies such as those shown in FIGS. 6 and 7. It will be understood that the left half of the assembly 121 will also be compressed to retain and seal with the tube 122, however, FIG. 9 has been shown in this manner to show the transition between the pre-assembly 131, then the merely telescoped condition of the tube and sleeves, and finally the finished assembly 121 at the lower right of this FIG. 9.

The advantage of the pre-assembly 131 is easier fabrication of the entire tubing joint assembly 121. The two tubes 122 and 123 may simply be pushed into the radial space between these two tubes until they abut the stop flange 129. Next the dies, like dies 35 and 36, may laterally compress the assembled parts forming a compressed area 132 on the outer surface of the outer sleeve 125. This will again have the interdigitated teeth, not shown, but similar to the toothed area 114 of FIG. 5. This compresses the outer sleeve 125 onto the tube 123, and likewise onto tube 122. Also the tubes will be compressed inwardly onto the peripheral ribs 126 of the inner sleeve 124. This compression again forms the zig-zag seal path of the previously described embodiments and the peripheral ribs 126 bite into the inner wall of the tubes such as tube 123 to create compression formed lateral shoulders 133. These act as the retention means to resist longitudinal force on the assembly 121 and the biting surfaces 127 bite into the tubes 122 and 123 to form an annular seal which seals high fluid pressures.

The axially parallel ridges 130 also bite into the inner wall of the tubes 122 and 123 to form mating teeth in such inner tube walls and thus be effective to resist relative rotation between the tubes 122 and 123 and the sleeves 124 and 125. This still further makes a stronger joint assembly 121.

Figure 10:
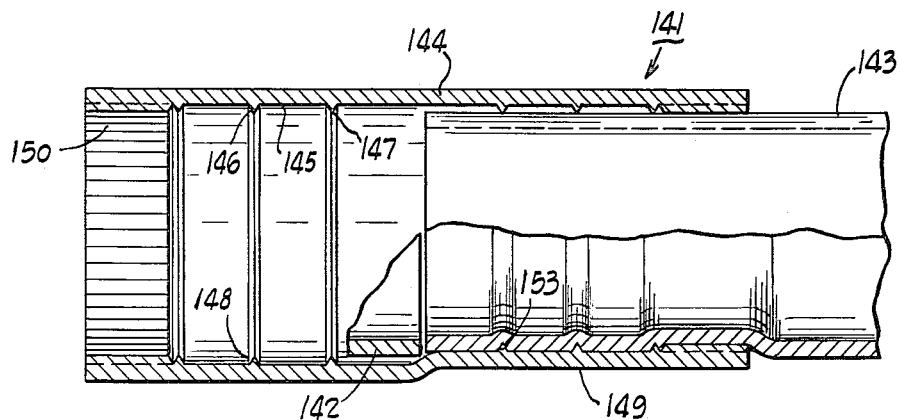
FIG. 10 is a longitudinal sectional view showing the sequence of steps of obtaining an assembled fitting of a further modification.

FIG. 10 illustrates a tubing joint assembly 141 wherein first and second tubes 142 and 143 are joined by an outer sleeve 144. An inner sleeve is optional in this construction. The FIG. 10 again shows the transition between only the outer sleeve 144 at the left side of the figure with the one tube 142 merely slid into place and at the upper right of FIG. 10 the tube 143 is shown slid into place in the right half of the sleeve 144. The lower right of FIG. 10 shows the transition to the completely finished assembly 141 wherein the sleeve 144 has been compressed onto the tube ends.

The sleeve 144, in this embodiment, has on the inner wall 145 thereof peripheral ribs 146 which are V-shaped and the small end of the V is that which forms biting surfaces 147 and the sides of the ribs 146 form lateral shoulders 148. The inner wall 145 of the sleeve 145 of the sleeve 144 also has axial ridges 150. Upon the outer sleeve 144 being compressed, as by the dies 35 and 36, a compressed area 149 is formed which again will have a toothed area similar to toothed area 114 of FIG. 5, although not shown in FIG. 10. The compression dies will cause the peripheral ribs 146 to bite into the outer wall of the tubes 142 and 143 to form compression formed lateral shoulders 153. This again forms the retention means to resist longitudinal force or fluid pressure on the tubing joint assembly 141, and also forms the annular seal means primarily at the biting surfaces 147. Also the axial ridges 150 bite into the outer wall of the tubes 142 and 143 to form an antirotation lock resisting relative rotation between the tubes 142 and 143 and sleeve 144. A stop flange similar to stop flange 129 may be provided on the interior wall of sleeve 144, if desired.

Figure 11:
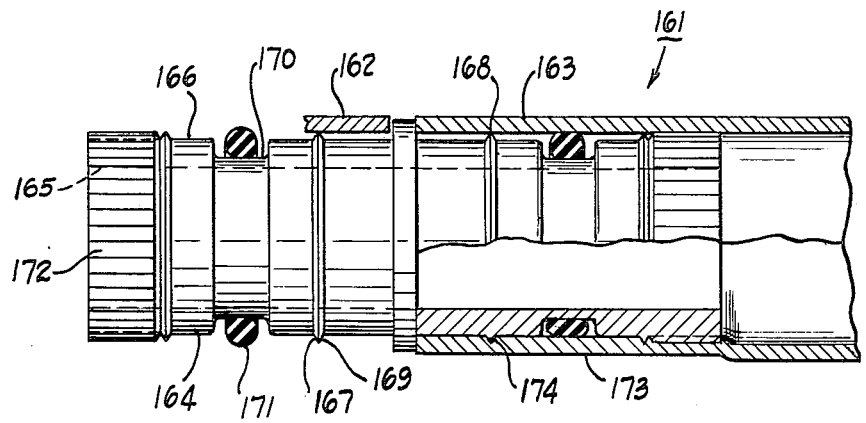
FIG. 11 is a longitudinal sectional view showing the sequence of steps of obtaining a further modification.

FIG. 11 illustrates another tubing joint assembly 161 which joins tubes 162 and 163 by means of an inner sleeve 164. An outer sleeve, not shown, is optional in this construction. Again this FIG. 11 shows the transition at the top of the figure with the tubes 162 and 163 merely telescoped over the sleeve 164, and at the lower right of this figure the tube 163 is shown compressed upon the sleeve 164. The tube 162 would likewise be compressed on the sleeve 164 in order to form the completed tubing joint assembly 161.

The inner sleeve 164 has an inner bore 165 to carry the fluid and has an outer wall 166. Peripheral ribs 167 are provided which again are V-shaped and the small end of the V provides biting surfaces 168 and the ribs also provide lateral shoulders 169. The inner sleeve 164 is relatively thick walled to accommodate grooves 170 in which yieldable seal means is provided. This may be some liquid, plastic or semiplastic sealant such as a thermosetting resin which will set up to seal between the tube and sleeve, but as shown is an O-ring 171. Axially parallel ridges 172 are also provided at the ends of the sleeve 164. Dies similar to the dies 35 and 36 may be used to laterally compress the tubes 162 and 163 onto the inner sleeve 164 and this will form the compressed area 173 which again has the toothed area on the outer surface thereof similar to toothed area 114 of FIG. 5. Again this forms the zig-zag seal path, not shown, but similar to that in the previously described embodiments. The compression of the tubes 162 and 163 onto the sleeve causes the peripheral ribs 167 to bite into the inner wall of the tubes to create compression formed lateral shoulders 174. These lateral shoulders cooperate with the lateral shoulders 169 to resist longitudinal force between the tubes 162 and 163 and the inner sleeve 164. Also the biting surfaces bite into the tubes to create an annular seal path to withstand high fluid pressures. The O-rings 171 are a part of the seal means to establish this fluid tight seal. The compressed area 173 also causes the axial ridges 172 to bite into the inner wall of the tubes 162 and 163 to again provide antirotation locking between the tubes 162 and 163 and the sleeve 164.

Figure 12:
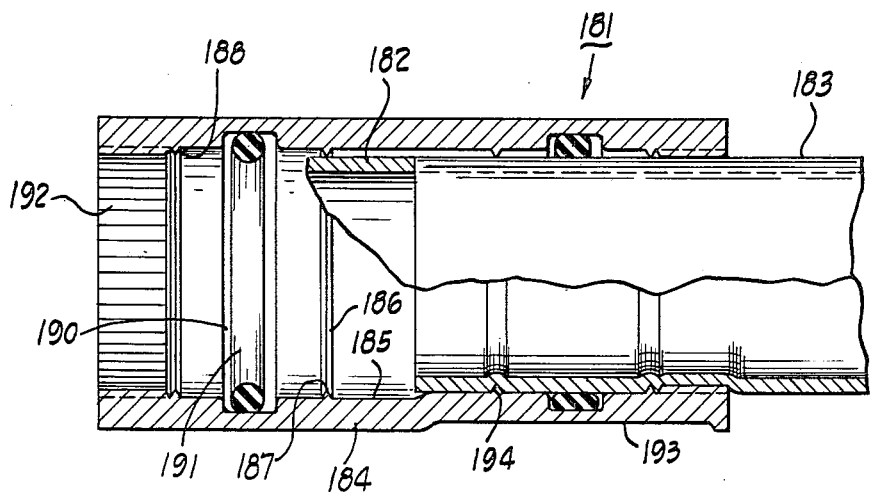
FIG. 12 is a longitudinal sectional view showing the sequence of steps of obtaining a still further embodiment.

FIG. 12 illustrates another tubing joint assembly 181 which includes tubes 182 and 183 and an outer sleeve 184. The sleeve 184 has an inner wall 185 which has peripheral ribs 186 thereon. These ribs are V-shaped to have a sharp biting surface 187 and lateral shoulders 188. The sleeve is relatively thick walled to accommodate grooves 190 in which a yieldable sealant may be provided such as liquid or semiplastic but as shown may accommodate O-rings 191. Also axially parallel ridges 192 are provided near the ends of the sleeve 184 on the inner wall 185.

FIG. 12 illustrates the tubing joint assembly 181 in the various steps of its formation with the tube 182 partly shown as being telescoped within the sleeve 184 at the left side of FIG. 12 and tube 183 telescoped within the sleeve at the upper right portion of this figure. The lower right portion of FIG. 12 illustrates the completed tubing joint assembly 181 wherein dies similar to dies 35 and 36 have been used to form a compressed area 193 on the outer surface of the sleeve 184. This lateral compression of the sleeve causes the peripheral ribs 186 to bite into the outer wall of the tubes 182 and 183 and establish compression formed lateral shoulders 194. Again these shoulders 194 cooperate with the lateral shoulders 188 to form a longitudinal retention of the tubes 182 and 183 within the sleeve 184. Also the biting surfaces 187 form the annular seal path with the tubes to hold high fluid pressures. The O-rings 191 supplement this seal means to maintain such seal despite any expansion or contraction due to temperature changes, for example.

The various embodiments of FIGS. 1, 3, 4, 5, 9, 10, 11 and 12 show that the peripheral ribs are established on either the inner or outer wall of one of the tubular parts. In the FIGS. 1, 3, 4, 5, 9 and 11 such peripheral ribs are established on an outwardly facing wall, which wall is telescoped relative to an inwardly facing wall and then such telescoped tubular parts are compressed together. In the FIGS. 10 and 12 such peripheral ribs are established on an inwardly facing wall, which wall is telescoped relative to an outwardly facing wall and then such telescoped tubular parts are compressed together. Upon being compressed, the biting surface of the peripheral rib acts against and is radially restrained by the other of the facing walls.

It will be noted in the various embodiments that after the various assembled parts are inwardly compressed, the radial thickness of the combined compressed radial parts is less than the nominal radial dimension of the tube and sleeve or sleeves used in the complete assembly. This inward compression makes the metal flow so that a fluid pressure tight seal is achieved as well as forming the compression formed lateral shoulders 58, 74, 90, 117, 133, 153, 174 and 194 which act against the initially formed lateral shoulders on the inner sleeves.

In the various FIGS. 1, 3, 4 and 5 it will be noted that the zig-zag seal paths 54, 76, 93, 94, 115 and 116, have a length longer than the longitudinal length of the inner sleeve, such as sleeve 23. The same applies, although not shown, in FIGS. 9-12. This establishes a long path over which fluid pressure must seek to escape, and is considered a reason why the tubing joint assemblies are so mechanically strong and will withstand such high fluid pressures, for example 2,000 psi.

In the various embodiments of FIGS. 1, 3, 4, 5, 9 and 11, the inner sleeve may be machined by a form tool, for example, to cut the grooves, such as grooves 64, 170 and 190. In the embodiments of FIGS. 10 and 12, the outer sleeves may be roll formed or machined to form the peripheral ribs, as by machining away metal between the ribs. Metal remaining between the grooves form the biting surfaces, which may be considered as substantially axially parallel lands between the lateral shoulders, or as V-shaped ribs.

The toothed areas, such as areas 46, 72, 92 and 114 are longitudinally extending, and they include peripheral teeth which alternate in direction and overlap each other. These individual teeth are interdigitated and it is this overlapping of narrow teeth, the width of the tooth approximating the wall thickness of the tube, that permits the great amount of inward compression of the tube against the inner sleeve for an effective seal beneath this toothed area. The prior art construction, using a pair of dies without the interdigitated fingers, often bulged the sleeve outwardly at the junction between the two dies rather than compressing it inwardly as in the present invention.

The peripheral ribs on the outer surface of the inner tubular part or on the inner surface of the outer tubular part have some longitudinal extent, although they may be relatively sharp, such as the V-shaped crest of threads. The dies 35 and 36 may be formed in many different manners. Forming the fingered plates as separate plates and then assembling them together to make the complete die in the die holder 37 is an economical way to fabricate the entire die. If such is the case, there are often small peripheral ridges 59 on the exterior surface of the tubing joint assembly, but this does not impair the efficiency of the seal or retention means.

In the tubing joint assembly 11, for example, the first tubular part 15, the tube 19, and the sleeve 23 are all tubular parts which are telescoped together. In the assemblies 11, 161 and 181, the first tubular part 15, 164 and 184 has a thicker wall thickness than the tubes 11, 162, 163, 182 and 183 so that even if made of the same material, they resist inward compression as the tubes are being compressed thereonto. In the tubing joint assemblies 61, 81, 101, 121 and 161 the inner sleeve may often be made of steel or some other metal harder than that of the tube and this is a means to resist inward crushing of such sleeve as the tube is compressed onto this sleeve.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tubing joint assembly, comprising in combination,
   a first metal tubular part having an inner wall and an outer facing wall,
   a metal tube telescoped over said first tubular part and having inner and outer facing walls,
   a metal sleeve telescoped over said tube and having an inner facing wall,
   a plurality of sharp annular shoulders on one of said facing walls,
   and a herringbone inward compression path on two longitudinally opposite sides of the outer surface of said sleeve establishing a zig-zag compression path of a length longer than that of said sleeve and compressing inwardly said sleeve against said tube and establishing a corresponding zig-zag compression path compressing said tube against said first tubular part to establish a fluid tight seal especially at said sharp annular shoulders to physically lock together said tubular part, tube and sleeve.

2. A tubing joint assembly as set forth in claim 1, wherein said sharp annular shoulders are on said outer wall of said first tubular part.

3. A tubing joint assembly as set forth in claim 1, wherein said first tubular part is of a metal harder than the metal of said tube.

4. A tubing joint assembly as set forth in claim 1, wherein said first tubular part includes means to resist laterally inward compression to a greater extent than said tube.

5. A tubing joint assembly as set forth in claim 1, including an annular laterally extending shoulder on said first tubular part frictionally engaging the inner surface of said sleeve.

* * * * *